Jan. 5, 1932.    O. R. SKELTON    1,840,136

REAR CROSS MEMBER

Filed Dec. 19, 1927

INVENTOR
OWEN R. SKELTON.
BY
ATTORNEY

Patented Jan. 5, 1932

1,840,136

UNITED STATES PATENT OFFICE

OWEN R. SKELTON, OF DETROIT, MICHIGAN, ASSIGNOR TO CHRYSLER CORPORATION, OF DETROIT, MICHIGAN, A CORPORATION OF DELAWARE

REAR CROSS MEMBER

Application filed December 19, 1927. Serial No. 241,000.

This invention relates to rear cross members adapted to be used on automobile frames.

One of the objects of my invention is to provide a rear cross member which may be utilized to cover the gasoline tank as well as provide a supporting means therefor.

Another object of my invention is to provide a cheap and economical cross member adapted to improve the appearance of the rear end of the automobile.

With the above and other objects in view, my invention consists in the arrangement, combination and construction of the various parts of my improved device as described in the specification, claimed in my claims and shown in the accompanying drawings, in which:

I have shown a conventional gasoline tank indicated generally at 5 which is positioned between two frame channel members, one of which is shown at 6.

Figure 1:
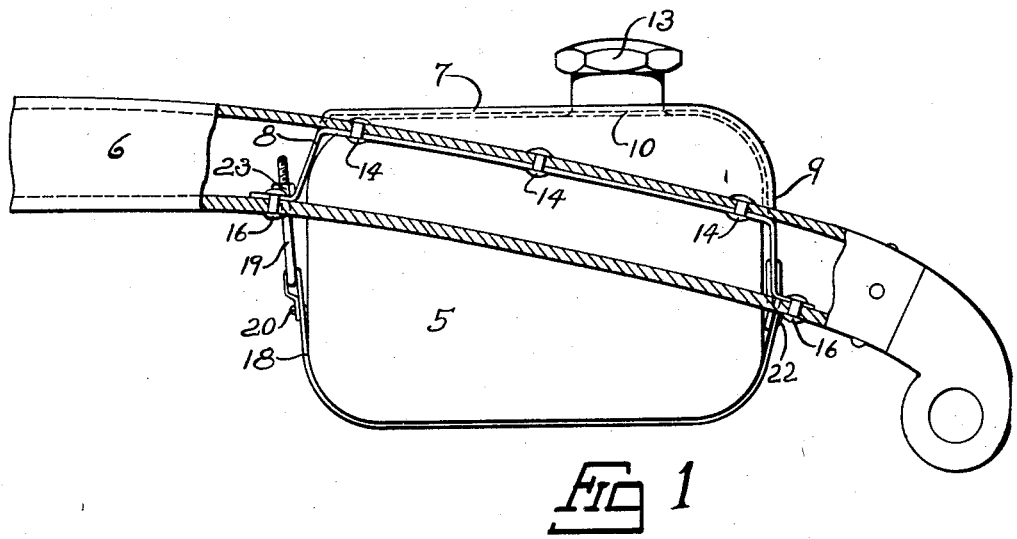
Fig. 1 is a side elevation showing a gasoline tank and automobile frame with my improved member positioned thereon, a portion of the frame being broken away to better illustrate the invention.
Figure 2:
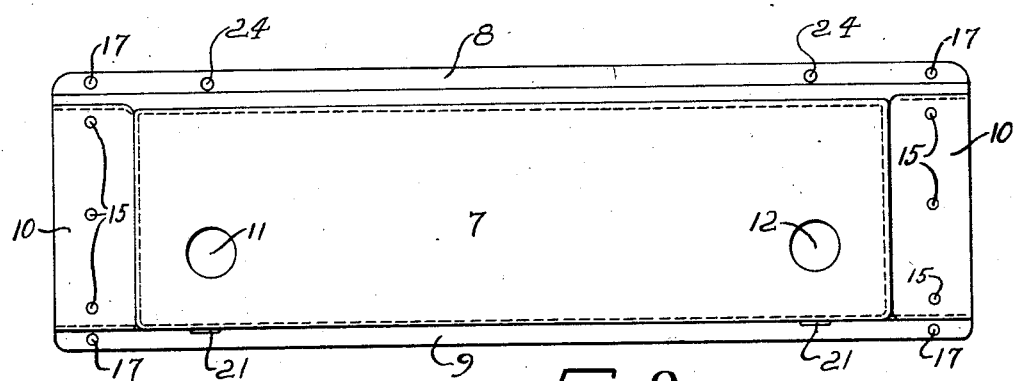
Fig. 2 is a plan view of my improved cross member.
Figure 3:
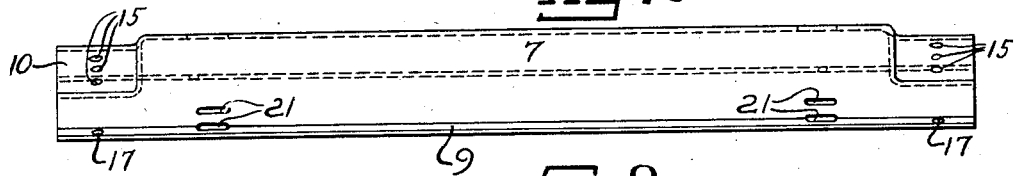
Fig. 3 is an elevation thereof taken from the rear.
Figure 4:
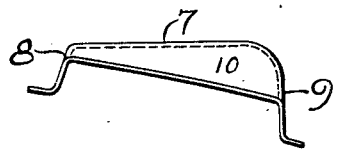
Fig. 4 is an end view of the cross member.

I have also provided a generally channel shaped cross member comprising a main body portion 7, side members 8 and 9 and depressed end portions 10. Suitable openings 11 and 12 are provided in the body portion 7 to permit the gasoline tank cap 13 and reserve device top or fuel outlet pipes (not shown) to extend therethru when the member is in the position shown in Fig. 1.

The cross member is so shaped that the ends 10 are in a plane inclined to the plane of the body portion when the body portion is in a horizontal position. The member may be secured to the frame members by means of rivets 14 or other suitable means thru the openings 15 in the ends 10 and rivets 16 thru the openings 17 in the side portions 8 and 9.

The top of the tank 5 is adapted to fit in the main body portion 7 of the cross member and the tank may be supported in a horizontal position therein by means of straps 18, the ends of which are secured at one end to the member 19 by being return bent thru an eye in the end of member 19 and riveted as at 20, and the other ends of which extend thru the slots 21 in the cross member and are return bent and riveted as at 22. The members 19 are screw threaded on their upper ends, extending thru openings 24 in the side portion 8 of the cross member, and are secured thereto by means of nuts 23 on the screw threaded end.

It will thus be apparent that in a construction embodying my improved cross member, the gasoline tank will be covered completely thereby as well as supported in a horizontal position between the frame members. It is further apparent that this construction is both simple and economical and improves the appearance of the rear end of the vehicle.

It will be obvious that various changes may be made in the arrangement, combination and construction of the various parts of my improved device without departing from the spirit of my invention and it is my intention to cover by my claims such changes as may reasonably be included within the scope thereof.

What I claim is:

1. A rear cross member of generally channel shaped formation having a main body portion, side members, one of which is wider than the other, and end portions depressed out of the plane of the main body portion having flanges extending in a general direction of the length of the body portion.

2. A rear cross member of channel shaped formation having a main body portion, side members, and end portions depressed out of the plane of the main body portion having flanges extending in the general direction of the length of the body portion, the plane of said flanges being inclined to that of the main body portion.

3. A rear cross member of channel shaped formation having a main body portion, side members, one of which is wider than the other, and end portions depressed out of the plane of the central body portion, the plane of said end portions being inclined to that of the main body portion.

4. A rear cross member of generally channel shaped formation having a central body portion, side members one of which is wider than the other, and end portions depressed out of the plane of the main body portion having side members of equal length.

5. A rear cross member of generally channel shaped formation having a central body portion, side flanges on said body portion, depressed end portions, the plane of said end portions being inclined to that of the main body portion, and side flanges of equal length on said end portions.

6. A cross member of generally channel shaped formation having a main body portion, and end portions depressed out of the plane of the main body portion having outwardly extending flanges.

7. A construction of the class described comprising, side frame members of an automobile, and a cross member therebetween having a main body portion extending substantially in a horizontal plane and having end portions depressed out of the plane of the main body portion and at an angle thereto secured to said frame members.

OWEN R. SKELTON.